Dec. 17, 1963  H. U. BRUECKNER ETAL  3,114,286
SLIDE TRANSFER MECHANISM
Filed May 27, 1960  4 Sheets-Sheet 1

INVENTORS
HUBERT U. BRUECKNER,
EDWARD E. FLUSKEY and
WOLODYMYR WERBYCKYJ

BY Lawrence C. Field
ATTORNEY

Dec. 17, 1963  H. U. BRUECKNER ETAL  3,114,286
SLIDE TRANSFER MECHANISM
Filed May 27, 1960  4 Sheets-Sheet 2

INVENTORS
HUBERT U. BRUECKNER,
EDWARD E. FLUSKEY and
WOLODYMYR WERBYCKYJ
BY
Lawrence L. Field
ATTORNEY Dec. 17, 1963   H. U. BRUECKNER ETAL   3,114,286
SLIDE TRANSFER MECHANISM
Filed May 27, 1960   4 Sheets-Sheet 3
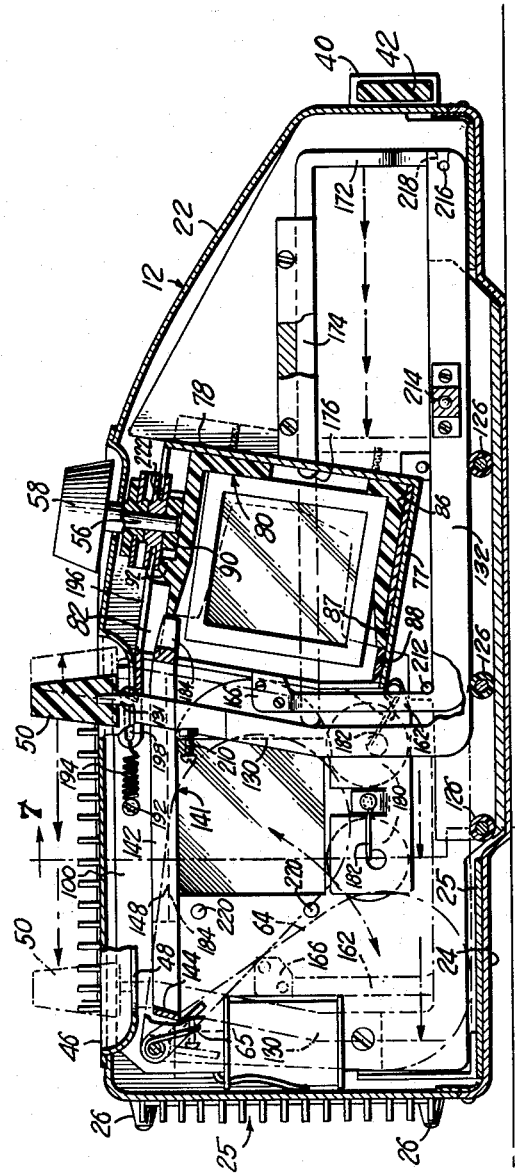
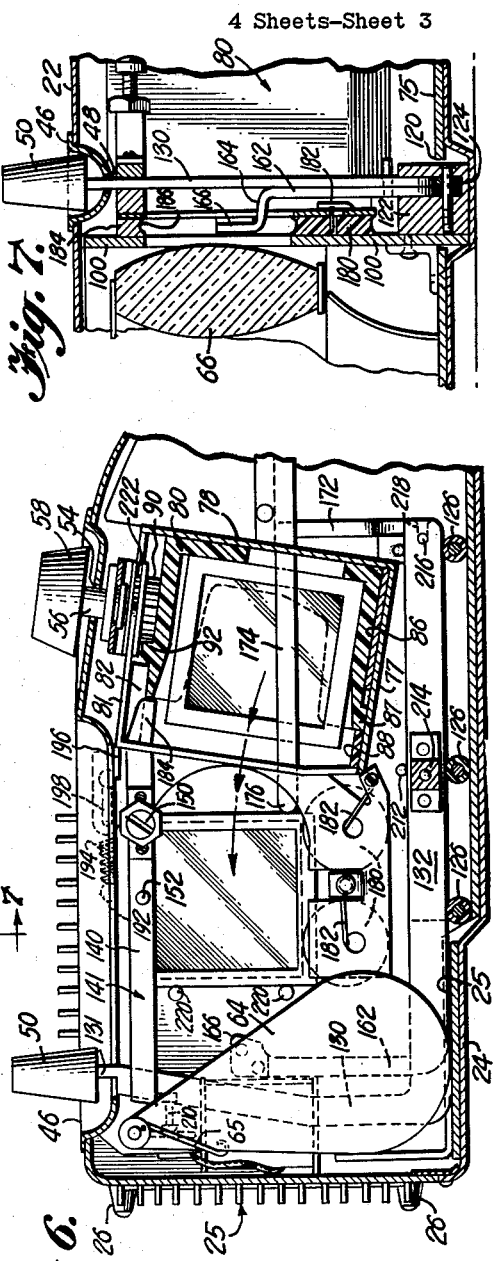
INVENTORS
HUBERT U. BRUECKNER
EDWARD E. FLUSKEY and
WOLODYMYR WERBYCKYJ
BY Lawrence A. Field
ATTORNEY

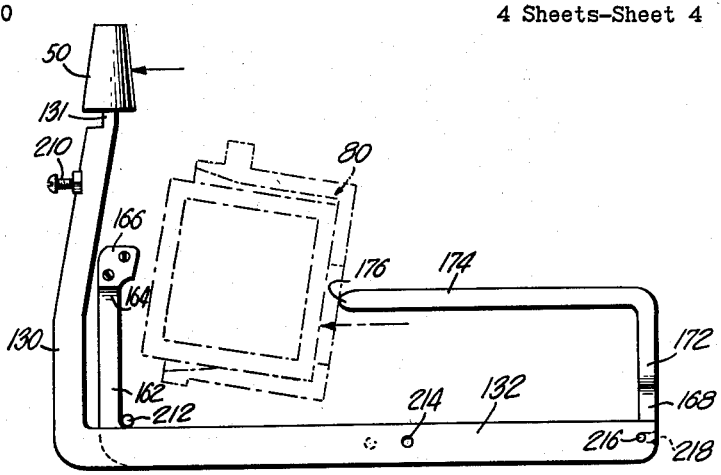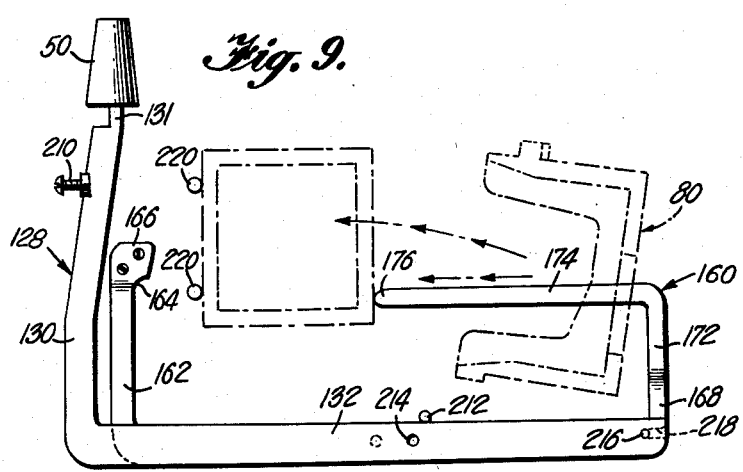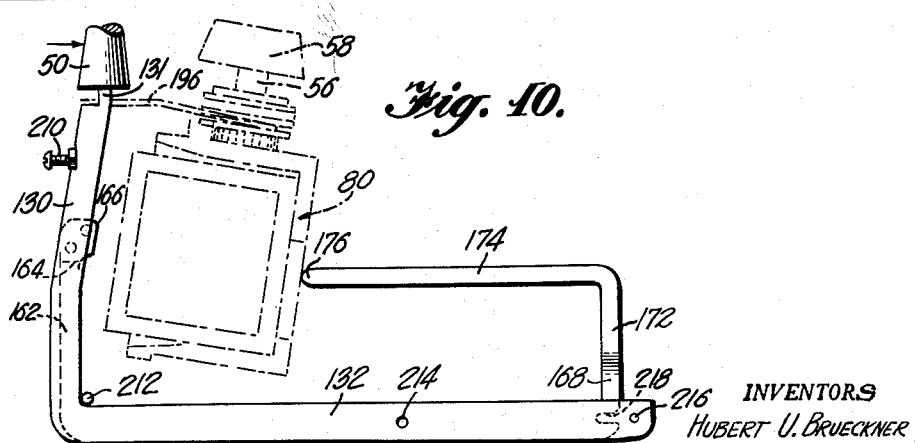

United States Patent Office 3,114,286
Patented Dec. 17, 1963

3,114,286
SLIDE TRANSFER MECHANISM
Hubert U. Brueckner, Lombard, Edward E. Fluskey, Oak Park, and Wolodymyr Werbyckyj, River Grove, Ill., assignors, by mesne assignments, to Minnesota Mining and Manufacturing Company, St. Paul, Minn., a corporation of Delaware
Filed May 27, 1960, Ser. No. 32,480
4 Claims. (Cl. 88—28)

This invention relates to a small and compact slide projector. More particularly, it relates to a simplified mechanism for transporting slides from a magazine into the viewing position and for returning the slides to the magazine.

One object of the invention is to provide a simple mechanism for moving slides out of a magazine and into a viewing position and for thereafter automatically returning them to the magazine and for then advancing the magazine into a position for presenting another slide to the slide transfer means, all by means of the movement of a single operating knob.

It is another object of this invention to provide an improved means for transferring a slide from a magazine to a viewing position and for returning it to the magazine in a simple and direct fashion, by means synchronized with other portions of the projector whereby the shutter is positively actuated by the slide transfer mechanism so that the shutter is always interposed to cut off illumination just prior to the movement returning the slide from viewing position to the magazine.

Still another object is to provide a simple and compact single magazine type projector wherein the forward movement of a single operation knob causes a selected slide to be transported from a slide magazine into a viewing position and also causes the opening of a shutter covering a light source, in timed relationship to the positioning of the slide to be viewed and wherein, after the slide has been viewed, the rearward or return movement of the single operating knob, in the reverse direction, causes the shutter to close, covering the light source; returns the slide to its correct position in the slide magazine and advances the slide magazine to bring the next slide into the proper alignment for withdrawal and viewing.

Still a further object of the invention is to provide a mechanism for locking the slide magazine in place so that the projection apparatus may be more conveniently transported.

Another object of the invention is to provide a construction wherein, by placing the actuating knob in a neutral position, the slide magazine may be positioned to bring any desired slide into viewing position, without the necessity for viewing all of the slides in the magazine in the order in which the magazine is loaded.

These and other objects will become apparent from the description of a compact and simple slide projector which follows and from the accompanying drawings in which:

FIGURE 5 is a section through plane 5—5 of FIGURE 3 showing the parts of the transport mechanism just prior to the ejection of a slide from the slide magazine;

FIGURE 6 is a fragmentary view of a portion of the apparatus of FIGURE 5 showing the mechanism with the slide in viewing position;

FIGURE 7 is a section taken on plane 7—7 of FIGURE 5; and

FIGURE 8 is a view showing parts of the transfer mechanism just before a slide has been moved out of the magazine;

FIGURE 9 is a similar view at a later stage; and

FIGURE 10 is a view showing details of the transfer mechanism after the slide has been returned to the magazine.

Figure 1:
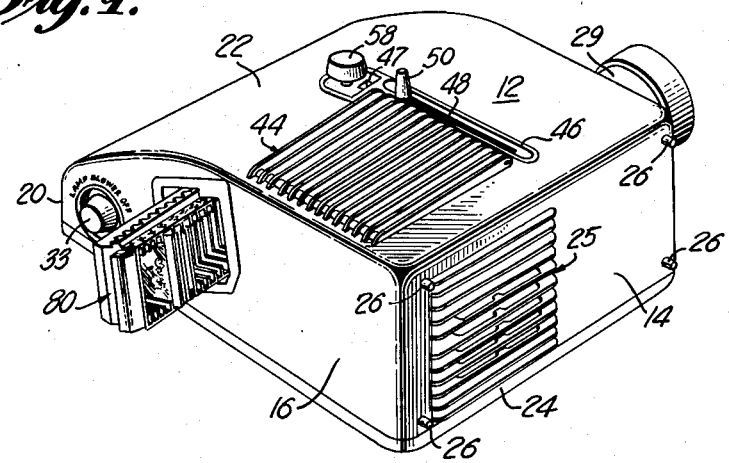
FIGURE 1 is a perspective view of a slide changer in which the present invention is incorporated.
Figure 2:
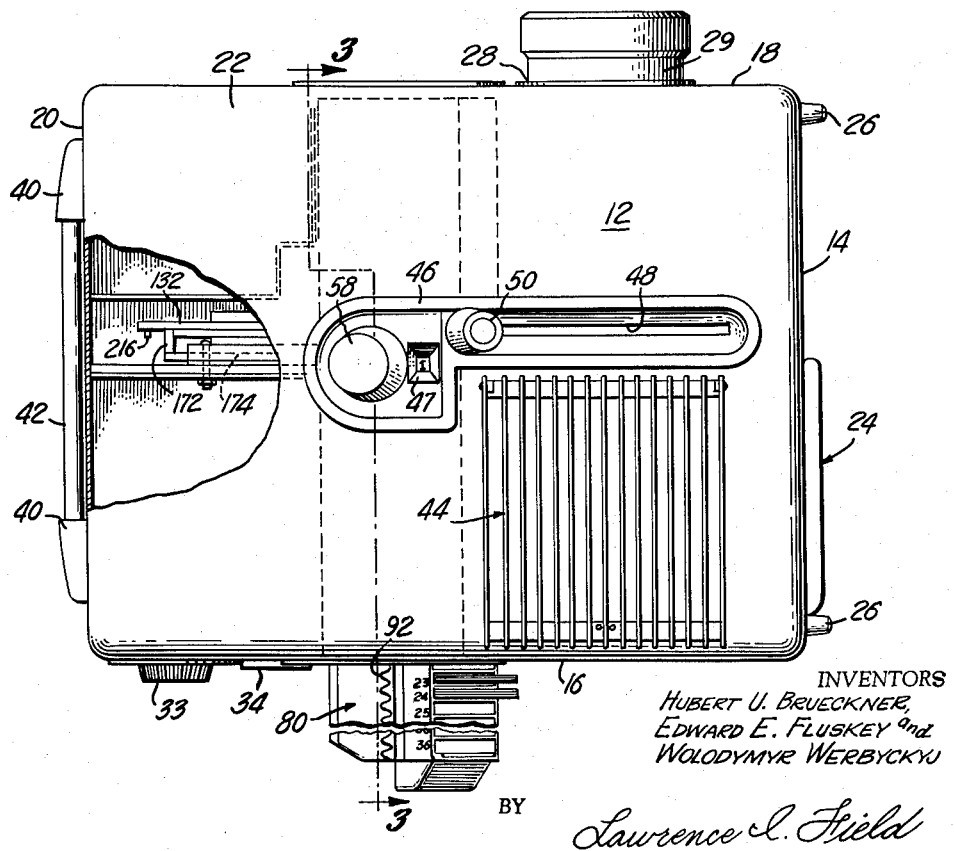
FIGURE 2 is a plan view of the projector with a portion of the casing broken away.
Figure 3:
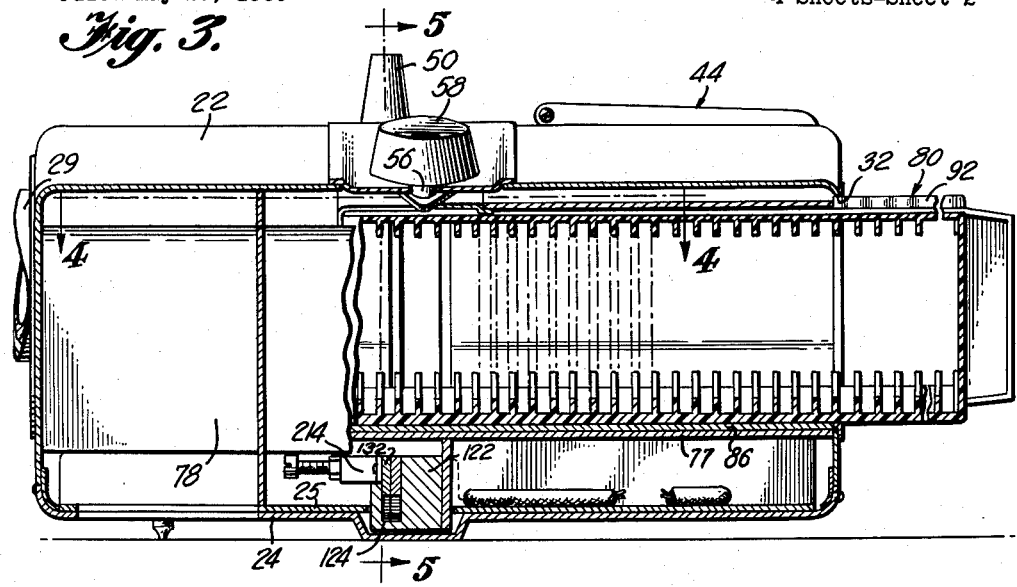
FIGURE 3 is a view partly in section along plane 3—3 of FIGURE 2.

Referring first to FIGURES 1 and 2, the slide projector is housed in a case 12 having a flat rectangular side wall 14, adapted to serve as the base when the projector is stored in an upright position, and two opposed generally rectangular rear and front walls 16 and 18 extending from base 14 to a relative narrower endwall 20. A cover surface 22 preferably molded integrally with walls 14, 16, 18 and 20, and a base 24 secured to case 12 by screws or other suitable fastening means, complete the enclosure wherein the mechanism is housed.

Wall 14, as shown, is provided with a grille 25 through which air is sucked into the casing by a fan (not shown) for ventilation. Secured in the four corners of wall 14 are legs 26 on which the projector may rest when stored in an upright position.

Front wall 18 is provided with a circular opening 28 through which the barrel 29 of a focusing tube may pass and is also provided with a generally rectangular shaped opening 30 through which a conventional slide magazine 80 may be advanced or retracted. The rear wall 16 is provided with a similarly dimensioned generally rectangular shaped opening 32 for the same purpose. Rear wall 16 supports a socket 34 adapted to receive a plug (not shown) for making electrical connection to a source of power and a switch knob 33 for connecting said power supply first to a blower and then to the projection lamp. Brackets 40 are secured to endwall 20 and receive and secure a flexible handle 42 by means of which the present apparatus may be carried.

When the projector is in the operating or slide-viewing position, shown in FIGURE 1, the upper most surface of case 12 is that designated by numeral 22. This surface is cut away to receive a grille 44 through which air is exhausted by action of the blower. Grille 44 is preferably hinged to case 12, so as to permit ready access to the lamp and condensing lens system located within the case 12. Approximately midway in surface 22, an elongated stamped frame element 46 enlarged at one end is secured in a correspondingly shaped opening provided in surface 22. A slot 48 in stamping 46 best seen in FIGURE 2 defines an elongated track for a slide changer operating knob 50. The enlarged loop-shaped portion of stamping 46 is provided with a cut away portion 47 through which numbers or other indicia identifying individual compartments in the slide magazine 80 may be seen. As best shown in FIGURE 6 stamping 46 is also formed with an opening 54 for a stub shaft 56 on which a magazine operating knob 58 is mounted.

Figure 4:
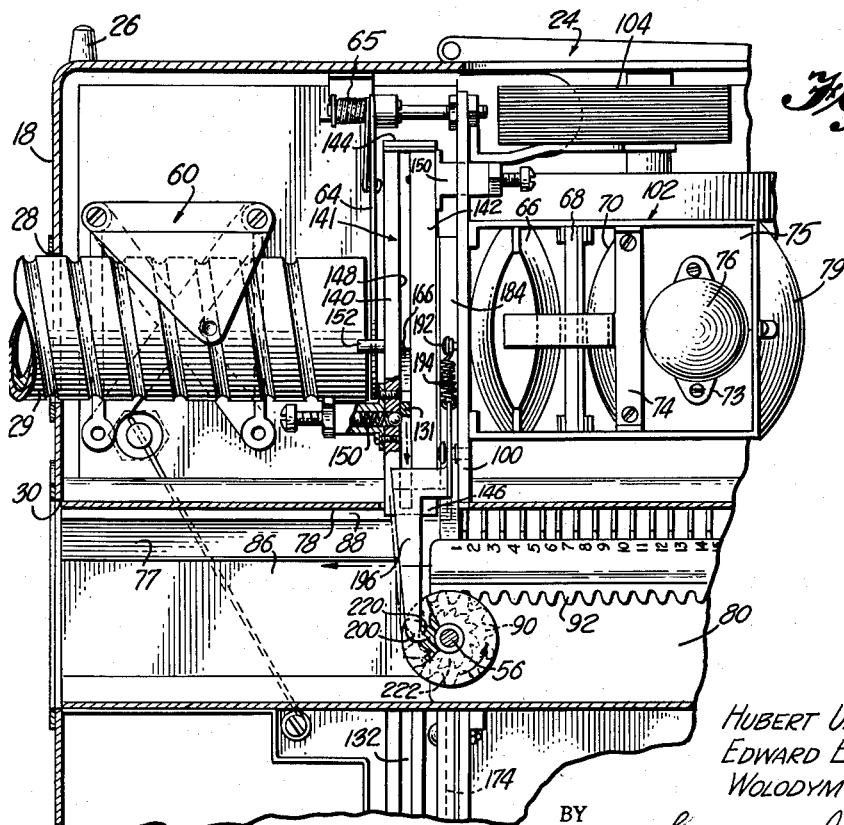
FIGURE 4 is a plan view of the projector with the cover removed, taken in the plane 4—4 of FIGURE 3.

Before describing the slide transfer mechanism itself, the general arrangement of parts of the optical system best seen in FIGURE 4 will be briefly discussed. These comprise the following: a support cradle 60 and threaded lens barrel 29 mounted therein; a shutter 64, a condensing lens 66, heat absorbing filter 68 and a collecting lens 70 all removably held in place in a suitable cage by a hold-down spring 74; and projection lamp 76 supported in a lamp base 73 on a base plate 75. Also suitably disposed behind the lamp 76 is a reflector 79 (FIG. 4). A vertical plate 100 serves as the support for the lens system cage 102 and also supports a cooling fan motor 104 which drives a cooling fan.

A generally rectangular shaped tunnel 78 extends from opening 30 in front wall 18 to opening 32 in rear wall 16.

A track for magazine 80 is formed by strips 86 and 88 between which there is received a flange 87 molded on one side of magazine 80. Tunnel 78 is formed with a solid floor 77 to which strips 86 and 88 are secured. The roof 81 of the tunnel is cut away to receive the mounting for the operating knob 58 and magazine positioning mechanism associated therewith, and also to receive portions of the slide transport mechanism. Both side walls of the tunnel are solid except for cut away slots in the plane of the slide transfer mechanism to receive various elements in the slide transfer mechanism. Secured to the roof 81 within tunnel 78 is a strip 82 adapted to bear against an upper surface of the slide magazine 80 to maintain it firmly in place in tunnel 78. Means for manually advancing or retracting magazine 80 along the length of tunnel 78 comprise a toothed gear 90 secured to stub shaft 56 and adapted to mesh with a toothed track 92 molded on one side of the slide magazine 80.

The slide transfer mechanism constituting the present invention and illustrated in detail in FIGURES 5 through 10 will now be described.

A slot 120 (FIGURE 7) is provided transversely across base plate 75 to receive the lowermost portion of support plate 100 which extends below the base plate 75 and to receive a channel shaped trackway 122 having an upwardly facing recess 124. Recess 124 houses a plurality of nylon rollers 126 on which a pair of sliding members 128 and 160 (best seen in FIGURES 8–10) are supported for movement within the recess 124.

The first of these sliding members 128 is generally L shape and consists of a relatively short upright leg portion 130 and a considerably longer horizontal leg 132. Leg 130 terminates in a tip 131 which carries slide changer operating knob 50. Tip 131 and the uppermost portion of leg 130 travel between the extremities of a trackway 148 positioned directly below trackway 48 in the cover 22. Trackway 148 is defined by a machined casting 141 having two side portions 140 and 142 and connecting end portions at each end as at 144 and 146. Near either end of the trackway there is a ball detent 150. Also supported on the forward surface of casting 141 is an extension 152 which serves as a stop for the shutter 64 (FIGURE 4). Another stop extends forwardly from the rear leg of channel member 122.

The second sliding member 160 shown behind the first sliding member in FIGURES 8–10 inclusive has an upright leg 162 terminating in a rearwardly offset portion 164 carrying a head 166. At the other end of the second sliding member there is an upstanding leg 168 having a similarly rearwardly offset extension consisting of a short vertical portion 172 and a longer horizontal arm portion 174 which terminates in a tip 176. When the second sliding member is caused to traverse its forward stroke, e.g. when the operator moves knob 50 toward the left as viewed in FIGURE 5, arm portion 174 is adapted to push a slide out of the magazine and into the viewing position and when the second sliding member is caused to reverse its direction of travel by the operator, head 166 is adapted to return the slide to the slide magazine 80.

Supported on a forward surface of support plate 100 are two or more grooved nylon rollers 180 onto which the slide is moved from the magazine. Each roller 180 is supported on a spring 182 so that the slide is urged upwardly against a grooved guide 184 during viewing. Guide 184 has a grooved underside 186 (FIGURE 7) which is bent so that it extends into close proximity with the open side of the slide magazine 80.

Also secured to the forward side of supporting plate 100 is a pin 192 to which is secured one end of a spring 194 the other end of which is secured to a slotted actuating lever 196 having a slotted portion 198 and an arm 200 the end of which constitutes a pawl 226 which engages a ratchet 222 on shaft 56.

The operation of the slide transfer mechanism will now be described, assuming that a loaded slide magazine 80 has been previously inserted into tunnel 78.

The slide magazine may be advanced by means of manual advance operating knob 58 to bring any desired slide into position, by viewing the identifying number on the magazine visible through window 47 and by turning the knob until the desired magazine number appears in the window 47.

With the transport mechanism in the position shown in FIGURE 5, knob 50 is moved toward the left as seen in FIGURE 5. As a result both the first sliding member and the second sliding member are moved to the left. Tip 176 pushes a slide out of magazine 80 and into groove 186 of the downwardly bent portion of guideway 184. The slide is advanced onto grooved rollers 180 and finally positioned for projection by locating pins 220.

As slide member 128 approaches the end of its stroke, a shutter actuating pin 210 trips shutter 64 against the action of a shutter return spring 65 and arm 130 reaches ball detent 150 at the same time that shutter 64 is opened.

While knob 50 remains at the extreme left limit of its stroke, the slide is projected by means of the optical system. After a suitable interval for viewing, the slide is returned to the magazine as follows:

Knob 50 is moved to the right, leg 130 moves past ball detent 150 and as it moves, it carries pin 210 away, permitting shutter 64 to be snapped back into a closed position by spring 65. Head 166 on leg 162 now urges the previously viewed slide toward the right, to return it to the slide magazine. When leg 162 strikes the second ball detent 214, the operator exerts sufficient force to overcome the resistance of the ball and spring and to cause tip 131 to contact arm 196 for actuation of the pawl which rotates ratchet and gear to advance the magazine.

As tip 131 strikes arm 196, the second sliding member 160 is engaged by stop 212 and both sliding members have then reached the full line position shown in FIGURE 5.

Further rightward movement of knob 50 and arm 130 causes the pawl 226 on arm 200 and ratchet 222 to advance magazine 80 one notch, and brings the vertical portion of arm 130 into engagement with both stop pin 212 and the exterior of magazine tunnel 78.

A repetition of the above movement can be performed to urge the magazine forward to any desired position.

When the magazine has been advanced one or more notches, arm 130 returns to the position shown in FIGURE 5 under the influence of spring 194.

Sliding members 128 and 160 are caused to move in unison throughout most of their strokes by ball detent 214, but as seen in FIGURE 10, during the last portion of the rightward stroke, when the pawl and ratchet advance magazine 80, the two sliding members do not move in unison.

At the right hand end of arm 132 is a pin 216 and at the lower right hand end of leg 162 is a slot 218 which is adapted to receive pin 216 during that portion of the stroke wherein the shutter is opened, and in which arm 132 slides while the second sliding member remains stationary.

Having now described our invention in accordance with the patent statutes:

We claim:

1. A slide projector including in combination: a base, a guide means extending transversely across and supported on said base, and having an upwardly opening channel therein; two sliding members disposed in said channel and adapted to be reciprocated along the length of said channel between a first position and a second position; means resiliently urging said two sliding members into engagement with one another for reciprocation in unison between said first and said second positions and for releasably disengaging said first and second members from one another whereby one of said members may move while the other of said members is stationary, when said latter member has reached said first position; means secured to the first of said sliding members for manually reciprocating said member; means secured to the second of said members for pushing a slide to be viewed from said first position in which it is stored in a magazine into said second position wherein it is aligned with the optical axis of the slide projector and wherein it is projected onto a viewing surface; additional means on said second member for returning the slide to the same position in the slide magazine whence it was originally withdrawn; means carried on one of said sliding members to transport a slide from said first position in which it is stored in a magazine to said second position, while said two sliding members are in engagement with one another and are moving as a unit said means being operable as the slide members approach the end of their stroke to open a shutter covering the optical axis of the slide projector; and means operable when one of said two sliding members is moving relative to the other of said members, in a continuation of the movement whereby the slide is returned to the slide magazine, for advancing said magazine stepwise, to bring a succeeding slide into alignment with the means transporting the slide into the viewing position.

2. The combination of claim 1 wherein the means urging the two sliding members to move in unison is a ball detent.

3. The combination of claim 1 wherein one of said sliding members supports means for actuating a shutter mechanism in synchronism with the movement of a slide into and out of a viewing position.

4. A slide projector having a housing and enclosed therein, an image projecting assembly including a lens and shutter in optical alignment with a slide receiving frame and a slide transport mechanism for selectively depositing slides into the slide receiving frame, said slide transport mechanism comprising: a slide magazine in close spaced parallel relation to the image-projecting assembly; drive means operatively connected to the magazine for selective positioning of slides into alignment with said slide receiving frame; selectively actuated means displaceable by a predetermined distance equal to the parallel spacing between the magazine and the slide receiving frame for deposit and return movement of a slide; advancing means responsive to return movement of the selectively actuated means to actuate the drive means for sequentially positioning another slide in the magazine into alignment with the slide receiving frame; said selectively actuated means comprising a slide-engaging sliding member and a manually operable sliding member and means operatively connected to said members for yieldably coupling the said sliding members in longitudinally spaced relation to each other, for movement in unison throughout said predetermined distance in both directions, and means positively coupling the two sliding members for movement in the slide depositing direction only, and wherein said means responsive to return movement of the selectively actuated means includes limit means restricting movement of both sliding members in the return direction of movement wherein one sliding member is longitudinally displaced relative to the other sliding member to drivingly engage the drive means, said slide engaging member including spaced slide engaging portions connected in offset relation to a bottom slide portion of said member, said manually operable member including an upwardly projecting portion having a control knob connected thereto and shutter and drive actuating means fixed thereto; said sliding members including adjacent, parallel, bottom slide portions disposed in side-by-side relationship; said bottom slide portions of the sliding members being operatively interconnected by a one way pin and slot connection at one end and a detent intermediate the ends for yieldable coupling thereof.

References Cited in the file of this patent
UNITED STATES PATENTS

| | | |
|---|---|---|
| 2,878,719 | Lutes | Mar. 24, 1959 |
| 2,909,962 | Goldberg | Oct. 27, 1959 |
| 2,914,985 | Badalich | Dec. 1, 1959 |
| 2,949,814 | Boughton et al. | Aug. 23, 1960 |
| 2,986,069 | Herrmann et al. | May 30, 1961 |

FOREIGN PATENTS

| | | |
|---|---|---|
| 772,637 | Great Britain | Apr. 17, 1957 |